April 26, 1932. D. B. MILLER 1,855,456
ROTARY TOOL
Filed June 19, 1930 2 Sheets-Sheet 1

INVENTOR.
David B. Miller
BY
F. P. Warfield
ATTORNEYS

April 26, 1932.    D. B. MILLER    1,855,456
ROTARY TOOL
Filed June 19, 1930    2 Sheets-Sheet 2

INVENTOR.
David B. Miller
BY
F. P. Warfield
ATTORNEYS

Patented Apr. 26, 1932

1,855,456

UNITED STATES PATENT OFFICE

DAVID B. MILLER, OF GREENFIELD, MASSACHUSETTS, ASSIGNOR TO MILLERS FALLS COMPANY, OF MILLERS FALLS, MASSACHUSETTS, A CORPORATION OF MASSACHUSETTS

ROTARY TOOL

Application filed June 19, 1930. Serial No. 462,207.

This invention relates to rotary tools, and, more particularly, to rotary screwdrivers, rotary nut-setters, and the like.

An object of the invention is to provide a rotary power-driven hand-tool which is simple and sturdy in construction, which has a long life, which can be readily and economically manufactured and assembled, and which will efficiently accomplish the purposes for which it is intended.

Another object is to provide a rotary tool equipped with improved means for relieving strain on the parts when the working element encounters an obstruction, or is otherwise restrained against movement.

Another object is to provide improved means for reducing wear on clutch members which transmit rotary motion from a driving spindle to a driven spindle.

Another object is to provide improved means for relieving strain on the parts when the working element of a rotary tool encounters an obstruction, regardless of the direction of rotation of the working element at the time when the obstruction is encountered.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawings, in which.

Figure 1:
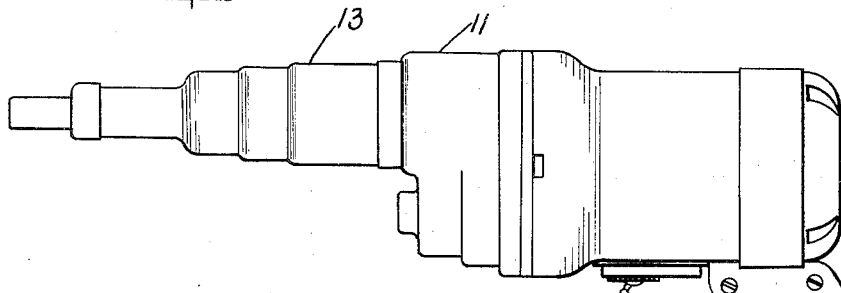
Figure 1 is a side view of a rotary power-driven screw-driver embodying the invention.
Figure 3:
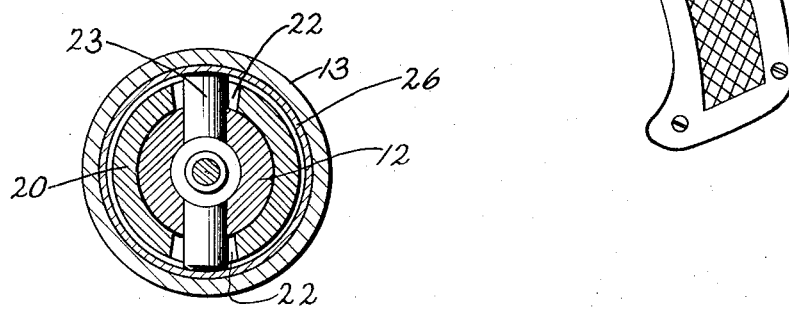
Fig. 3 is a transverse sectional view along the line 3—3 in Fig. 2.
Figure 2:
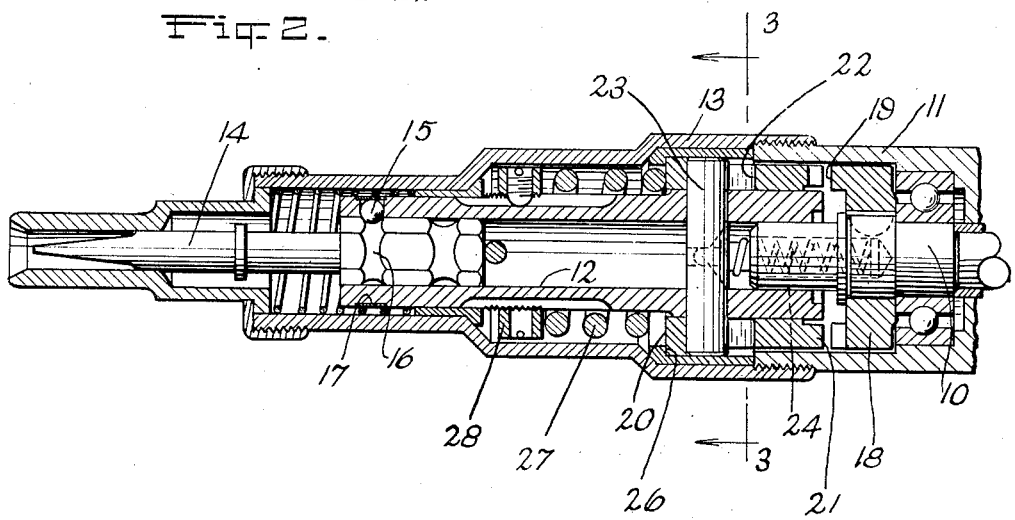
Fig. 2 is an enlarged sectional detail view of the working end thereof.
Figure 4:
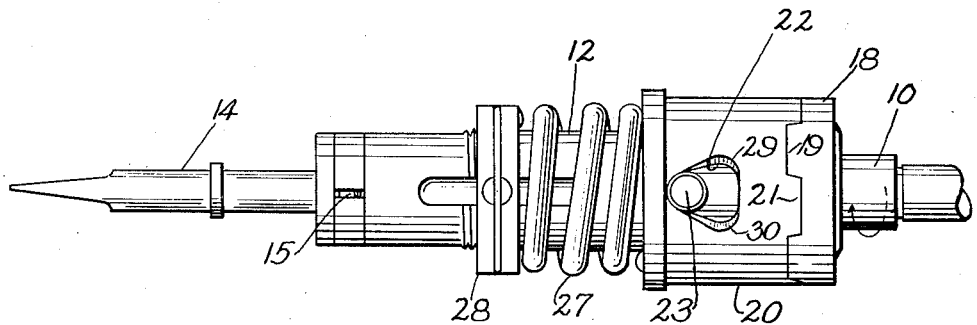
Fig. 4 is a top view of the operating parts showing the clutch members in engaged position.
Figure 5:
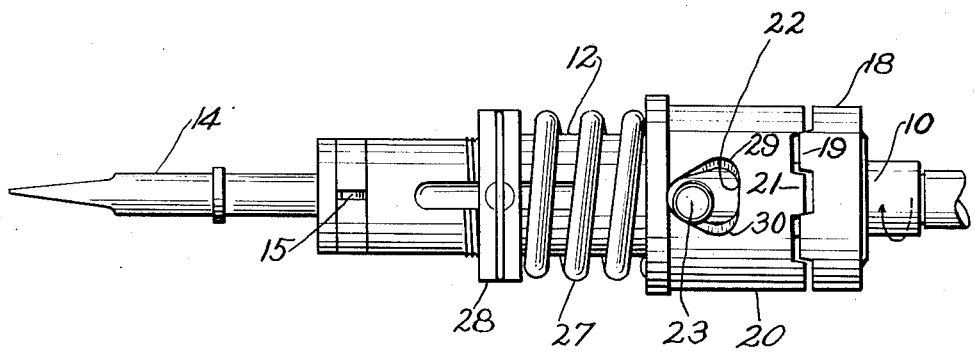
Fig. 5 is a similar view showing the position of the parts immediately after the screw-driving blade has encountered an obstruction.

In power-driven rotary tools it is of importance that the rotation of the member be halted and the operating parts relieved from strain whenever the working member is restrained against movement, as is the case when a screw is fully driven, a nut is fully set, or when unexpected obstruction prevents the screwing or unscrewing of a nut or screw when the operation of the drill is halted by encountering an obstruction, or when, for any of a variety of causes, the normal turning movement of the working member of such a tool is hindered; and it is of importance that the means provided for this purpose be of as permanent and rugged construction as possible and that wear on the various parts be reduced to a minimum. It is also of importance, as will be recognized, that the tool be arranged to operate satisfactorily, regardless of the direction of rotation of the working member. Even though conditions requiring the presence of such means may be encountered only occasionally, it will be readily appreciated that the failure of such a means to function in both directions might readily result in expensive, or at least annoying consequences, as well as in unnecessary strain on the operating parts.

In the exemplified embodiment of the invention the tool comprises a driving spindle 10 which is adapted for rotation in either clockwise or counter-clockwise direction by means of an electric motor which may be carried in the main casing 11 of the tool and a driven spindle 12, which, in the present instance, is cylindrical in form and is enclosed within a forward casing member 13. The driven spindle carries a suitable working element such as the screwdriver blade 14, which, in the present instance, is removably mounted by means of a ball 15 resiliently held within a groove 16 in the shank of the blade by an encircling ring 17.

The driven spindle 10 carries at its forward end a clutch member 18 provided with teeth 19, and an annular clutch member 20 having cooperating teeth 21 extends about the driven spindle 12. On opposite sides of the member 20 there are formed openings 22 into which extend the ends of a transverse pin 23 carried by the spindle 12. It is to be noted at this time that the openings 22 are longitudinally extended so as to permit longitudinal movement of the clutch member 20 with respect to the spindle 12.

In order to hold the clutch members 18 and 20 normally out of engagement there is provided a spring 24, one end of which is seated within a recess in the driving spindle 10, and the other end of which encircles a stud 25 carried on the pin 23. The spring 24 tends to hold the clutch member 20 against an annular shoulder 26 provided within the casing. The clutch member 20 is normally held in a forward position on the spindle with the pin 23 at the forward end of the openings 22 by means of a compression spring 27 extending about the spindle 12 between the annular clutch member and an annular shoulder provided by the nut 28 on the spindle.

It may now be observed that the sides of the openings 22 extend diagonally, as indicated at 29 and 30, so as to provide cam surfaces, whereby, regardless of the direction of rotation of the spindle 10 and the working element 14, any restraint on the working element will result in these cam surfaces riding forwardly upon the pin 23 so as to draw the clutch member 20 out of engagement with the clutch member 18.

The manner of operation of the tool will be readily apparent from the foregoing. The blade 14 is put in place on a screw and the tool pressed down on the screw so as to force the spindle 12 against the pressure of the spring 24 and to move the clutch members 18 and 20 into engagement. Under ordinary conditions the driving spindle 10 is already rotating, and will act through the clutch members to impart rotation to the spindle 12. This rotation continues until the screw is driven, until it encounters an obstruction, or until the working element 14 is otherwise restrained against movement, whereupon one of the cam surfaces at the sides of the V-shaped opening 22 will cause the clutch member 20 to ride downwardly along the spindle 12 so as to draw the teeth 21 out of engagement with the teeth 19. As soon as this engagement is broken the spring 27 will tend to cause the clutch member 20 to re-engage so that there results a clicking noise which notifies the operator that an obstruction has been encountered. If a left-handed screw is to be driven, or if any of a number of other operations requiring a rotary movement in the opposite direction is to be used the opposite cam surface will be effective to release the clutch when restraint of any sort is placed upon the working element.

The sides of the clutch teeth 19 and 21 are bevelled somewhat in the present instance, and may be bevelled more or less as desired, it being possible in certain instances to distribute the camming effect and the consequent wear on the parts between the cam surfaces and the clutch teeth, and in other instances to effect the entire camming action through the cam surfaces the latter may be readily designed so as to resist wear or to compensate for the same, if desired.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent, is:

1. In a rotary tool, in combination, a driving spindle, a driven spindle, a working element operatively connected with said driven spindle, a clutch member carried by the driving spindle, a co-operating clutch member adapted to impart rotation to the driven spindle and to move longitudinally with respect thereto, means tending to hold said clutch members in engagement, and means connecting said movable clutch member with said driven spindle and providing a cam surface for moving said movable clutch member out of operative position when the rotation of said driven spindle is restrained during the rotation of said driving spindle in one direction and a cam surface for moving said movable clutch member out of operative position when the rotation of said driven spindle is restrained during the rotation of said driving spindle in the opposite direction.

2. In a rotary tool, in combination, a driving spindle, a driven spindle, a working element operatively connected with said driven spindle, a pair of co-operating clutch members connected respectively to said spindles, one of said clutch members being mounted for longitudinal movement with respect to its spindle, a spring tending to move said movable clutch member toward the other of said clutch members, means connecting said movable clutch member with its spindle for moving said movable clutch member against the pressure of said spring when the rotation of said working element is restrained during the rotation of said driving spindle, said means comprising a laterally-extending element carried by one of the connected members, and means providing a V-shaped opening in the other of said connected members for the reception of said laterally-extending element.

3. In a rotary tool, in combination, a driving spindle, a driven spindle, a working element operatively connected with said driven spindle, a clutch member mounted to rotate with one of said spindles and adapted to be moved longitudinally thereof, a clutch member carried by the other of said spindles and adapted to be operatively engaged by said movable clutch member, means tending to move said movable clutch member toward the other of said clutch members, and means connecting said movable clutch member with its spindle and providing a cam surface for moving said movable clutch member out of operative position when the rotation of said driven spindle is restrained during the rotation of said driving spindle in one direction, and a cam surface for moving said movable clutch member out of operative position when the rotation of said driven spindle is restrained during the rotation of said driving spindle in the other direction.

4. In a rotary tool, in combination, a driving spindle, a driven spindle, a working element operatively connected with said driven spindle, clutch means for operatively connecting said spindles, said means comprising a clutch member carried by one of said spindles, an annular clutch member mounted on the other of said spindles and formed with a V-shaped opening pointing away from said other clutch member, a pin carried by the spindle on which said annular clutch member is mounted and extending into said opening, and yieldable means tending to hold said annular clutch member in engaged position.

5. In a rotary tool, in combination, a driving spindle, a driven spindle, a working element operatively connected with said driven spindle, a clutch member carried by the driving spindle, a transverse pin carried by the driven spindle, an annular clutch member encircling the driven spindle and formed with a heart-shaped opening pointing away from the first-mentioned clutch member and adapted to receive the end of said pin, and yieldable means tending to hold said annular clutch member in operative engagement with said first-mentioned clutch member with said pin fitting in the narrow portion of said heart-shaped opening.

6. In a rotary tool, in combination, a driving spindle, a driven spindle, a working element operatively connected with said driven spindle, a clutch member carried by the driving spindle, a transverse pin carried by the driven spindle, an annular clutch member encircling said driven spindle and formed with oppositely-disposed V-shaped openings pointing away from said driving spindle and adapted to receive the ends of said pin, and yieldable means tending to hold said annular clutch member in operative engagement with said first-mentioned clutch member with said pin fitting in the narrow portion of said V-shaped opening.

7. In a rotary tool, in combination, a casing, a driving spindle, a driven spindle adapted to have a limited longitudinal movement with respect to said driving spindle, a working element operatively connected with said driven spindle, a transverse pin carried by said driven spindle, a spring extending between said pin and said driving spindle and adapted to hold said spindles apart, a clutch member carried by the driven spindle, an annular clutch member encircling the driven spindle and formed with V-shaped openings pointing away from said driving spindle and adapted to receive the ends of said transverse pin, and a spring carried by said driven spindle and adapted to press said annular clutch member towards the clutch member carried by said driving spindle and to hold the narrow end of said openings against said transverse pin.

8. In a rotary tool, in combination, a driving spindle, a clutch member carried thereby, a cylindrical driven spindle, a working element operatively connected with said driven spindle, an annular clutch member extending about said driven spindle and formed with laterally-disposed V-shaped openings pointing away from said driving spindle, a transverse pin carried by said driven spindle and extending into said openings, a spring carried by said driven spindle and tending to press said annular clutch member toward the first-mentioned clutch member, means providing a seat at the end of said driving spindle, means providing a seat in the central portion of said pin, and a spring extending between said seats and tending to hold said driven spindle away from said driving spindle.

9. In a rotary tool, in combination, a driving spindle, a driven spindle, a working element operatively connected with said driven spindle, a pair of cooperating clutch members connected respectively to said spindles, one of said clutch members being mounted for longitudinal movement with respect to its spindle, a spring tending to move said movable clutch member toward the other of said clutch members, means connecting said movable clutch member with its spindle for moving said movable clutch member against the pressure of said spring when the rotation of said working element is restrained during the rotation of said driving spindle, said means comprising a transverse element carried by one of the connected members, means on the other of said connected members providing openings for the reception of the ends of said transverse element and having cam surfaces for effecting the movement of the movable clutch member, means providing a seat at the end of said driving spindle, means providing a seat in the central portion of said transverse element, and a spring extending between said seats and tending to hold said driven spindle away from said driving spindle.

10. In a rotary tool, in combination, a driving spindle, a driven spindle, a working element operatively connected with said driven spindle, a clutch member mounted to rotate with one of said spindles and adapted to be moved longitudinally thereof, a cooperating clutch member carried by the other of said spindles, a spring adapted to press said movable clutch member toward said cooperating clutch member, and means connecting said movable clutch member with said driven spindle and providing a cam surface for moving said movable clutch member out of operative position when the rotation of said driven spindle is restrained during the rotation of said driving spindle in one direction and a cam surface for moving said movable clutch member out of operative position when the rotation of said driven spindle is restrained during the rotation of said driving spindle in the opposite direction.

11. In a rotary tool, in combination, a driving spindle, a rotary working element, a clutch member carried by said driving spindle, a clutch member mounted for longitudinal movement with respect to said working element, resilient means tending to press said movable clutch member toward the first mentioned clutch member, and means connecting said movable clutch member with said driven spindle and providing a cam surface for moving said movable clutch member out of operative position when the rotation of said driven spindle is restrained during the rotation of said driving spindle in one direction and a cam surface for moving said movable clutch member out of operative position when the rotation of said driven spindle is restrained during the rotation of said driving spindle in the opposite direction.

12. In a rotary tool, in combination, a driving spindle, a driven spindle, a working element operatively connected with said driven spindle, a pair of cooperating clutch members connected respectively to said spindles, one of said clutch members being mounted for longitudinal movement with respect to its spindle, a spring tending to move said movable clutch member toward the other of said clutch members, and means connecting said movable clutch member with said driven spindle and providing a cam surface for moving said movable clutch member out of operative position when the rotation of said driven spindle is restrained during the rotation of said driving spindle in one direction and a cam surface for moving said movable clutch member out of operative position when the rotation of said driven spindle is restrained during the rotation of said driving spindle in the opposite direction.

13. In a rotary tool, in combination, a driving spindle, a driven spindle, a working element operatively connected with said driven spindle, a clutch member carried by the driving spindle, a cooperating clutch member adapted to impart rotation to the driven spindle and to move longitudinally with respect thereto, an unconnected spring tending to press said movable clutch member toward the other clutch member, and means connecting said movable clutch member with said driven spindle and providing a cam surface for moving said movable clutch member out of operative position when the rotation of said driven spindle is restrained during the rotation of said driving spindle in one direction and a cam surface for moving said movable clutch member out of operative position when the rotation of said driven spindle is restrained during the rotation of said driving spindle in the opposite direction.

14. In a rotary tool, in combination, a driving spindle, a driven spindle, a working element operatively connected with said driven spindle, a pair of cooperating clutch members connected respectively to said spindles, one of said clutch members being mounted for longitudinal movement with respect to its spindle, an unconnected spring tending to move said movable clutch member toward the other of said clutch members, and means connecting said movable clutch member with its spindle for moving said movable clutch member against the pressure of said spring when the rotation of said working element is restrained during the rotation of said driving spindle.

15. In a rotary tool, in combination, a driving spindle, a driven spindle, a working element operatively connected with said driven spindle, a clutch member mounted to rotate with one of said spindles and adapted to be moved longitudinally thereof, a cooperating clutch member carried by the other of said spindles, a spring adapted to press said movable clutch member toward said cooperating clutch member, means including a pin and a cam surface for moving said movable clutch member against the pressure of said spring when the rotation of said driven spindle is restrained during the operation of said driving spindle, means providing a seat at the end of said driving spindle, means providing a seat in the central portion of said pin and a spring extending between said seats and tending to hold said driven spindle away from said driving spindle.

16. In a rotary tool, in combination, a driving spindle, a clutch member carried thereby, a driven spindle, a working element operatively connected with said driven spindle, a clutch member mounted to rotate with said driven spindle and adapted to be moved longitudinally thereof, means tending to hold said spindles apart and yieldable when said working element is in engagement with the work to permit said clutches to be engaged, a spring carried by said driven spindle tending to prevent the separation of said clutches, and means connecting said movable clutch member with said driven spindle and providing a cam surface for moving said movable clutch member out of operative position when the rotation of said driven spindle is restrained during the rotation of said driving spindle in one direction and a cam surface for moving said movable clutch member out of operative position when the rotation of said driving spindle is in the opposite direction.

In testimony whereof I affix my signature.

DAVID B. MILLER.